United States Patent

[11] 3,634,006

[72] Inventor Henry C. Hollwedel, Jr.
San Francisco, Calif.
[21] Appl. No. 18,421
[22] Filed Mar. 11, 1970
[45] Patented Jan. 11, 1972
[73] Assignee George Lithograph Company
San Francisco, Calif.

[54] MACHINE FOR PRODUCING PLATES AND PRINTS FROM MICROFILM
7 Claims, 12 Drawing Figs.
[52] U.S. Cl............................................. 355/3, 355/10, 355/14
[51] Int. Cl.................................................. G03g 15/00
[50] Field of Search......................................... 355/3, 14, 7, 10, 53, 68; 226/33

[56] References Cited
UNITED STATES PATENTS
2,816,493 12/1957 Lewis et al................... 355/14
3,248,029 4/1966 Money........................ 266/33 X
3,256,791 6/1966 Blume et al.................. 355/14 X
3,299,787 1/1967 Kolb et al.................... 355/14 X Primary Examiner—Samuel S. Matthews
Assistant Examiner—Robert P. Greiner
Attorney—Julian Caplan ABSTRACT: A machine for making printing plates or prints from positive or negative microfilm rolls has a table movable horizontally in two directions to adjust the position of a portion of an electrostatic copier which rests thereon. The copier has a paper cutter, transport, corona charger, exposure positioner, developer, squeegee, dryer and discharge but omits the scanner and associated elements normally employed in such machine. Above the copier is a photographic enlarger having its film holder replaced by apparatus which accurately advances microfilm frame by frame. The image of each frame is formed upon a cut sheet of copy paper at rest on the exposure positioner. The exposed sheet is then developed as the next sheet is advanced to exposure position and the next frame is advanced in the microfilm advance apparatus.

INVENTOR.
HENRY C. HOLLWEDEL, JR.

BY

*Julian Caplan*
ATTORNEY

INVENTOR.
HENRY C. HOLLWEDEL, JR.

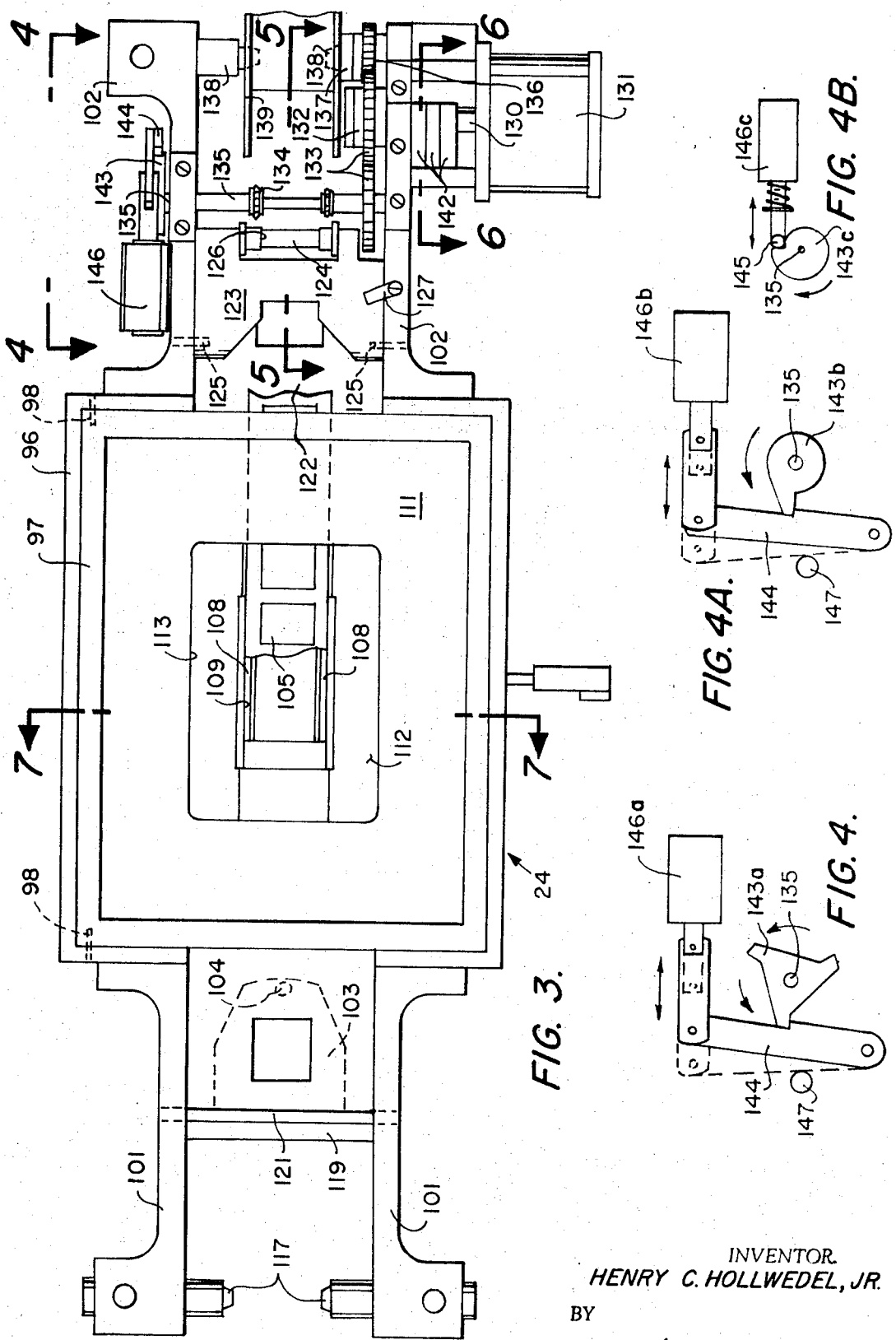

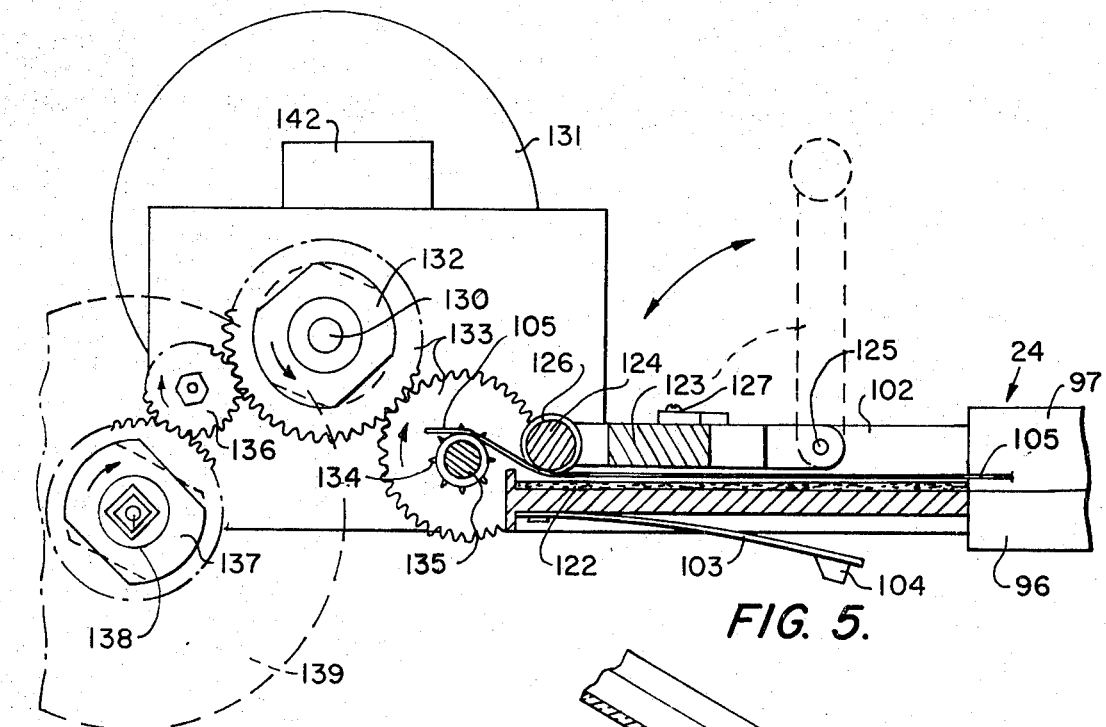
FIG. 5.
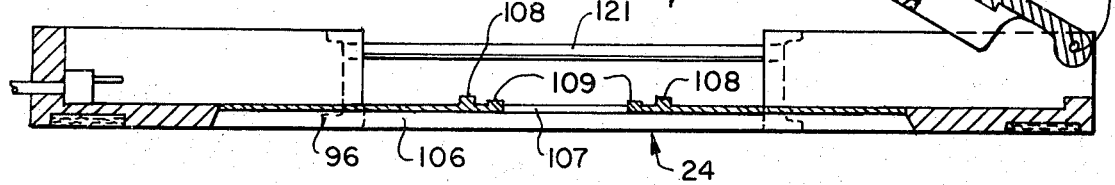
FIG. 7.
FIG. 7A.
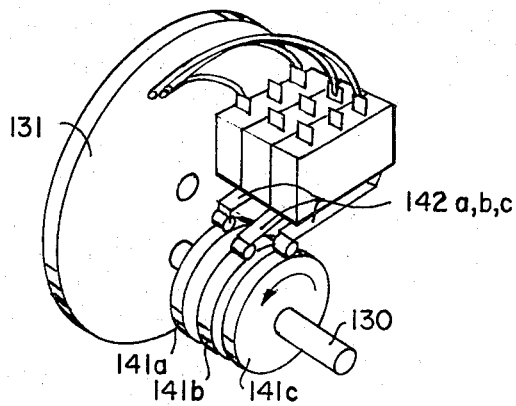
FIG. 6.
INVENTOR.
HENRY C. HOLLWEDEL, JR.
BY
Julian Caplan
ATTORNEY

MACHINE FOR PRODUCING PLATES AND PRINTS FROM MICROFILM

This invention relates to a new and improved machine for producing plates and prints from microfilm.

A principal purpose of the present invention is to provide a low-cost, high-resolution system for preparing offset printing master plates or prints from microfilm material. The offset master produced is of higher quality image than in other processes, particularly in that the system does not produce background imperfections.

Another principal feature of the invention is the rapidity with which plates can be produced in the machine hereinafter described. The production of the plates and prints is highly automated and the attendant need not devote close attention to the operation of the machine except when a new roll of microfilm is being installed.

Another principal feature and advantage of the invention is that there is wide variation in the magnification of the microfilm and infinitely minute gradation in the control thereof. A photographic enlarger head is positioned above the plate and may be elevated and depressed in infinite variations and the lens of the enlarger may be interchanged to achieve the desired degree of magnification.

Another feature of the invention is the fact that either negative or positive microfilm may be used with this system. The film itself may have four or six perforations per frame or nonperforated film may be used.

Another feature of the invention is the fact that either printing plates or prints may be made by the use of the system.

Other objects of the present invention will become apparent upon reading the following specification and referring to the accompanying drawings in which similar characters of reference corresponding parts in each of the several views. In the drawings:

FIG. 3 is an enlarged sectional view taken substantially along the line 3—3 of FIG. 1.

FIG. 4 is a further enlarged, fragmentary view of the cam and associated mechanism used in the machine, as viewed substantially along the line 4—4 of FIG. 3.

FIG. 4A is a modification of the structure of FIG. 4.

FIG. 4B is another modification of the structure of FIG. 4.

FIG. 5 is an enlarged sectional view taken substantially along the line 5—5 of FIG. 3.

FIg. 6 is a perspective view of the cams and associated structure as viewed substantially along the line 6—6 of FIG. 3.

FIG. 7 is an enlarged, transverse sectional view taken substantially along the line 7—7 of FIG. 3 with the upper frame open.

FIG. 7A is an enlarged, fragmentary sectional view of a portion of the film holder mechanism with the upper frame closed.

Figure 1:
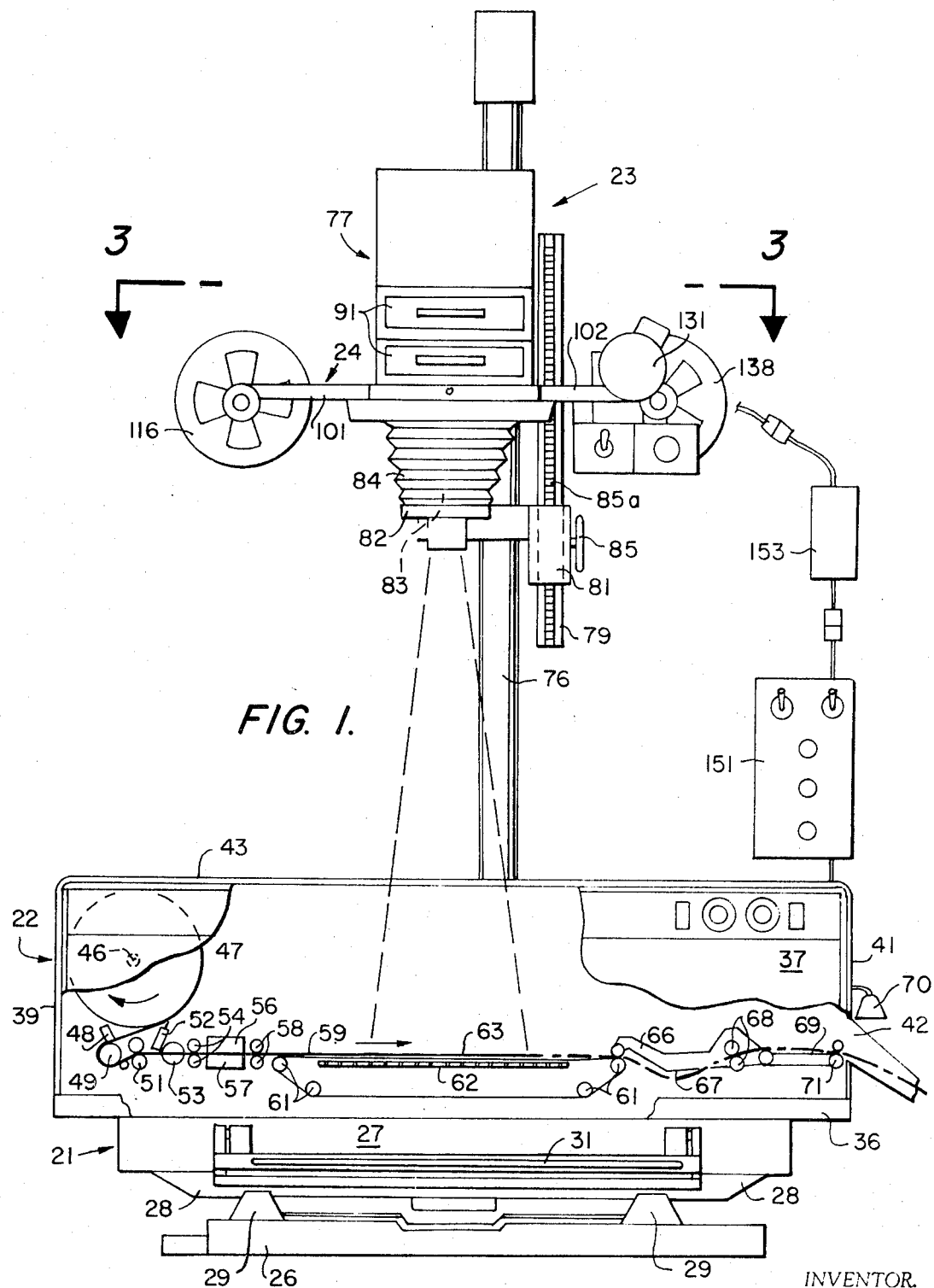
FIG. 1 is a front elevational view of the machine partly broken away in section to reveal internal construction.
Figure 2:
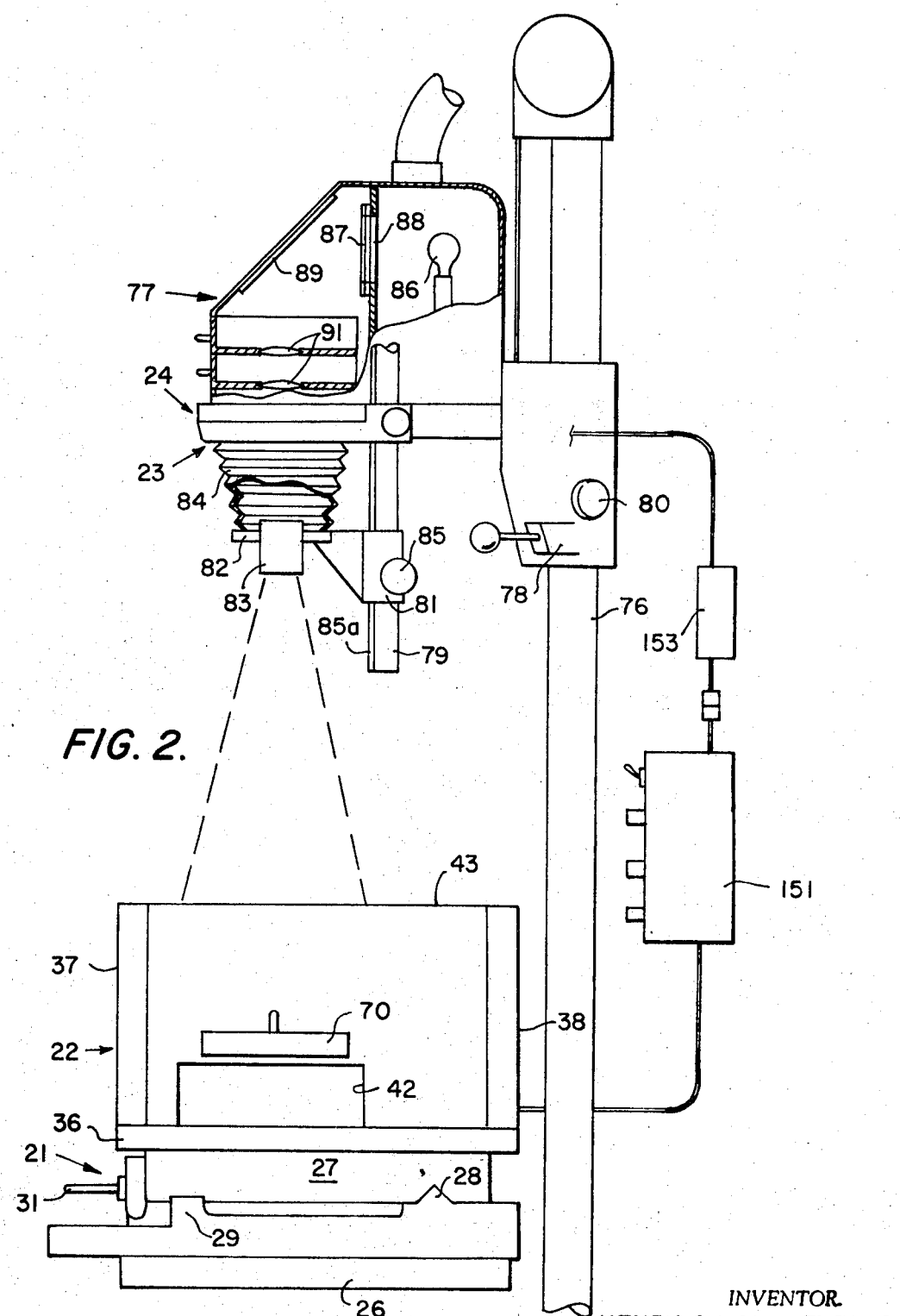
FIG. 2 is an end elevation thereof likewise partly broken away in section to reveal internal construction.

Essentially the machine hereinafter described in detail is made of five components, four of which are commercially available and merely adapted to the requirements of this machine. A table 21 has a horizontal top which is movable longitudinally and transversely to center the work relative to the frame to be exposed thereon. A suitable two-axis production table manufactured by the Alzmetall Works of Germany is illustrated and partially described. Such table provides a rapid setting with a positive locking lever which does not employ the screws of a conventional milling machine table. Mounted directly upon table 21 is a copier 22. Illustrated herein is a portion of A. B. Dick Co. No. 675 Electrostatic Copier with certain parts (particularly the scanner and lamp) removed. Mounted above copier 22 is a photographic enlarger 23 and that shown herein is Durst Laboratory 138S. The conventional film holder of the enlarger is replaced by a microfilm advance mechanism 24 which is illustrated and described in detail herein. Essentially the microfilm advance mechanism 24 supports a roll of microfilm and advances the same frame by frame through the enlarger in timed sequence to the advance of paper through the copier. The shutter of the enlarger opens to expose the sheet from which the printing plate is made to the image of the microfilm frame. Instead of a shutter, the lamp could be turned on and off by a switch. Such sheet is then developed, dried and discharged providing an enlarged plate of the microfilm frame. Alternatively, the sheet could be used as a print of the frame. The various components of the machine will be described in detail.

TABLE

Table 21 has a base 26 which is placed on the floor or a suitable support. Above base 26 is a top 27 which is horizontally disposed and which moves relative to base 26 in longitudinal ways 28 and transverse ways 29. A pivoted latching handle 31 locks top 27 relative to base 26. When handle 31 is unlatched, the top 27 may be moved longitudinally and transversely to center the work relative to the optical axis of the lens of enlarger 23. It will be understood that other types of positioning tables may be substituted for that above described, the important features being that the table top 27 move horizontally along two axes and be locked in place when properly positioned.

COPIER

The copier shown in detail in FIG. 1 is commercially available. Only a portion of the parts are illustrated. The copier uses a special paper which is coated with zinc oxide on one side to enable the paper to accept and hold an electrical charge for a short period of time. The entire zinc oxide coated side of the paper receives a negative charge. The paper becomes photoconductive when struck by light, which causes the paper to lose its negative charge. The charged paper is exposed to light passing through a microfilm frame. To produce a positive plate from a positive (i.e., clear background, dark image) frame, the clear areas of the frame are enlarged and focused upon the paper and discharge the nonimage area of the copy paper. The copy paper leaves the exposure bed with a latent negative charge on its surface corresponding to the dark image area on the original (positive) frame. The image is developed on the zinc oxide coated side. A ("positive") toner solution consisting of carbon particles in a state of colloidal suspension in a petroleum dispersant receives the exposed paper. The carbon particles have been charged chemically to positive ions. The positively charged carbon particles are attracted to the latent, negatively charged image on the copy paper which produces the visible copy. Since the nonimage area has no charge, the carbon particles are not attracted to it. Thus a positive plate is produced from a positive microfilm frame. A similar procedure is used with a negative microfilm frame except that "negative" toner, having negatively charged carbon ions is attracted to the latent, positively charged image on the copy paper to produce a positive plate from a negative microfilm frame. Remaining charge on the plate is discharged as it leaves the machine.

Copier 22 has a base 36 which rests upon the top 27 of table 21. Front 37, back 38, left end 39 and right end 41 extend upward from base 36, the right end 41 being provided with a discharge opening 42 through which the completed plate is discharged. The top 43 in accordance with the present invention, is open, the normal cover having been removed.

Within the copier are supports 46 for a roll 47 of coated copy paper of the type described. Solenoid 48 controls the amount of feed of paper 47. Decurler rollers 49 remove the curl of the paper and feed rollers 51 feed the paper through the space between rotary cutter blade 53 and spring biased stationary cutter blade 52. The timing of cutter 53 is such that a piece of paper from which the plate is to be made is cut to desired length. Forwarding rollers 54 then move the cut sheet between vertically spaced negative corona assembly 56 and the positive corona assembly 57. The corona assemblies provide a high-voltage discharge which negatively charges the top surface of the paper. A second set of feed rollers 58 advances the cut sheet onto a plurality of transversely spaced continuous belts 59. Belts 59 are driven by belt drive rollers 61 through a chain drive (not shown) a predetermined distance such that the paper is very accurately centered relative to the optical axis of enlarger 23, the distance of advance depending on the length of sheet cut and having been previously determined by test and by adjustment of table 21. Below the top stretch of belt 59 is a vacuum plate 62 which is perforated and through which air is drawn holding the paper on belts 59 at exposure position 63. After the sheet is exposed, the belts 59 are moved, passing the exposed sheet under guide 66 and into developer trough 67 which has been filled with a toner of the type described. The latent image on the plate is developed. To conserve developer, squeegee rollers 68 squeeze excess toner back into the developer trough 67 and advance the plate through dryer 69 and thence through discharge feed 71 and out through discharge opening 42. Lamp 70 above opening 42 discharges static and improves quality as the plate is discharged. A completed plate is thus produced.

In normal usage of copier 22, the original from which the copy is reproduced is positioned face down above the top 43 and a scanner or light source is moved longitudinally of the machine causing light to be reflected from the original onto the sheet at the exposure bed 63. The scanner mechanism, lamp, cover glass and opaque glass associated with the scanner are removed or deactivated in accordance with the present invention. The plates are exposed directly from the microfilm advance 24 held in the enlarger 23.

ENLARGER

Enlarger 23 is of a professional precision type wherein the head and lens move vertically to focus the image of the film relative to the exposure bed 63. Only portions of the enlarger are hereinafter described. Mounted adjacent table 21 is a vertical column 76 projecting well above the copier 22. Vertically slidable with respect to column 76 is the enlarger head 77 which is held in various positions along column 76 by a head adjustment control 78. Knob 80 is used to adjust the position of head 77 on column 76. Depending from head 77 is a lens guide 79 which receives a sleeve 81 connected to a lens support 82 in which the lens holder 83 containing the enlarging lens is mounted. Knob 85 in conjunction with rack 85a on guide 79 adjust the position of lens holder 83. Interposed between lens holder 83 and lens head 77 is a conventional bellows 84. Contained within head 77 is a lamp 86 which, in the form of the invention herein described, is continuously energized. In front of lamp 86 is a shutter 87 which is electrically operated in times sequence to the advance of the microfilm and of the plate sheet. One or more filters 88, which may be heat or light absorbing and/or colored, may be interposed between the lamp 86 and shutter 87. Lamp 86 may be of a mercury vapor or quartz iodide type for best definition, but may also be of incandescent type. The machine may be used with an off-on switch for the lamp and no shutter. Disposed at an angle of 45° relative to the horizontal is a mirror 89 which reflects the light of lamp 86 vertically downward through two removable condenser lenses 91 which are removably held in head 77. The light is passed from lenses 91 through the microfilm advance apparatus 24 and thence through the lens in holder 83 and is sized by adjustment of the position of the head 77 on column 76 and focused by adjustment of the lens holder 83 on lens guide 79 so that a sharp image is produced on the exposure bed 63. The size of the enlargement has infinite adjustment and is controlled by moving head 77 up and down by knob 80 and by interchange of lens holders 83.

The enlarger is conventionally equipped, has a "Safe-lite" function used to indicate to processors the time when print paper may be moved. Such function is used to energize relays for actuation of the copier 22, as later set forth in the description of the electrical components.

MICROFILM ADVANCE

The microfilm advance apparatus 24 is an adaptation of a roll film holder used with the conventional enlarger 23. Certain modifications have been made therein which are of considerable importance in the present invention.

Member 24 consists of a lower frame 96 of irregular configuration into which nests upper frame 97, the parts being hinged together about hinge pins 98 which have their axes extending longitudinally. Lower frame 96 is formed with rear and forward extensions 101 and 102 respectively. One means to accurately locate advance member 24 relative to the optical axis of lens 83 is by means of latch plates 103 having downward projecting latch pins 104 which fit into holes (not shown) in head 77.

Lower frame 96 has a central rectangular aperture which is filled by lower masking plate 106 and is suitably secured therein. Plate 106 is formed with a central aperture 107 which is of a size equal to that of the frame of microfilm 105. On either side of aperture 107 are longitudinally extending guide bars 108 which are formed with recesses 109. The recesses 109 are of a depth about equal to the thickness of microfilm and their inner edges are spaced apart the width of the exposed area of microfilm 105. The raised outer portions of the guide bars 108 are spaced apart the width of the film itself. Hence the recesses 109 and bars 108 accurately locate and guide microfilm 105 as it is advanced over aperture 107. This ensures that the frame of the microfilm is accurately transversely located relative to the aperture 107. Upper frame 97 is formed with a large rectangular aperture which is filled with upper mask 111 having a glass plate 112 which covers the aperture 113 therein, aperture 113 being aligned with aperture 107 in the assembled position of the device so that light from lamp 86 passes through a frame positioned over aperture 107. Glass 112 insures that film 105 is flat since it rests directly over the film and there is only about 0.001 in. clearance between the top of the film and recess 109.

Mounted within rear extensions 101 is film input reel 116 which is supported by reel mounting centers 117 which are retractable to permit removal and insertion of reel 116 and which exert a drag on rotation of reel 116. Microfilm 105 has sprocket holes along the edges thereof in conventional fashion. The film 105 is fed from reel 116 over roller 121 of lower frame 96 and is held in frictional contact with felt 119 as it enters between lower frame 96 and upper frame 97 to clean the film. The friction and drag of the felt also ensure that the film is held taut as it is advanced through the machine. On the forward end of the holder 24 is felt 122 on lower frame 96. Mounted above felt 122 is a guide support 123 carrying a guide roller 124 which is weighted downwardly by reason of the weight of member 123. Roller 124 is formed with a central relief 126, the width of which is equal to that of the film being advanced. Hence roller 124 aligns the film relative to the longitudinal axis of member 24. In order to permit member 123 to be pivoted upwardly to install the film, it is provided with a hinge connection 125 on extension 102 and is held in down position by means of latch 127.

Motor 131 mounted on extension 102 drives the film. Motor 131 is provided with a clutch 132 which controls stopping and starting of motor shaft 130. Shaft 130 carries gears 133 which mesh with corresponding gears on sprocket shaft 135 which is mounted on sprocket 134. The sprocket pins of sprocket 134 are of an arcuate distance apart to accommodate the sprocket holes in the film 105. Also meshing with gear 133 is an idler 136 which drives a corresponding gear on clutch 137 to which is mounted pickup reel centers 138 carrying takeup reel 139. Thus when the clutch 132 is engaged, sprocket 134 is driven to advance the microfilm and at the same time the reel 139 is turned to take up the film.

Cams 141a, b, c are mounted on shaft 130 and are engaged by the rollers of microswitches 142a b, c. The electrical function of these switches is hereinafter explained. Mounted on sprocket shaft 135 is a cam 143 having, in the form shown in FIG. 4, three dwells. Adjacent cam 143 is pawl 144 which is actuated by solenoid 146 and is prevented from overmovement by stop 147. Pawl 144 when projected to dotted-line position of FIG. 4, permits the cam 143 to turn. When the solenoid 146 pulls pawl 144 to the full-line position, the pawl stops the cam 143 at the next dwell and thus accurately determines the advance of the film, so that it is accurately centered relative to aperture 107. It will be understood that some microfilm frames are of a length equal to four sprocket holes and some equal to a length of six sprocket holes. Hence in operation of the device it is necessary that the film be advanced the proper number of holes. This can be accomplished by interchange of cams of different numbers of dwells as is shown by comparison of the cam 143d of FIG. 4A with the cam 143 of FIG. 4, and by electrical switch means as hereinafter explained to activate only one or the other of switches 142b or c associated with either cam 143b or c, respectively.

FIG. 4B shows roller 145 of solenoid 146d directly engaging cam 143c but other functions of the apparatus are similar.

Figure 4C:
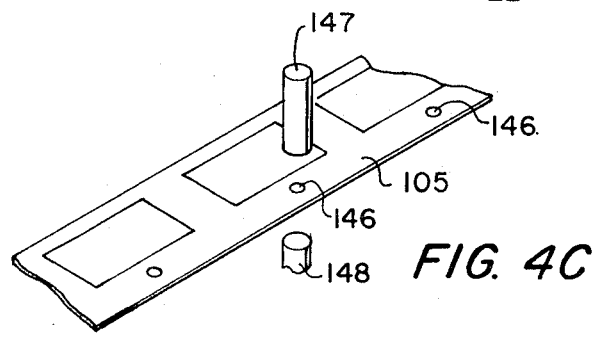
FIG. 4C is a perspective view showing an alternate means for accurately centering the microfilm frame relative to the enlarger.

Another alternative longitudinal locating device is shown schematically in FIG. 4C. Precise locating apertures 146 are formed at the side of film 105 relative to the exposure frames of the film 105. A light source 147 and electric eye 148 (or fiber-optic elements connected thereto) energize eye 148 when aperture 146 is in proper location to locate a frame over aperture 107 and a relay system then disengages motor clutch 132 to stop film advance.

MECHANICAL AND OPTICAL OPERATION OF THE DEVICE

Film 105 on reel 116 is installed in centers 117 and the film is inserted through the advance apparatus 24 by tilting upward frame 97 and raising support 123. The sprocket holes in the films are properly engaged by sprockets 134 and the lead end of the film is then installed in reel 139. Reel 139 is turned until the first frame of the film to be printed is accurately located relative to aperture 107 in a longitudinal sense, its transverse location being controlled by bars 108 as has been described. The motor of copier 22 is energized to advance one cut sheet onto exposure bed 63 and accurately retain the same in such position centered relative to the optical axis of enlarger 23. Thereupon shutter 87 is opened, causing light from lamp 86 to pass through the film frame and the image of the frame is accurately focused on the sheet at exposure bed 63. The timing of the shutter is determined in accordance with normal photographic procedures and controlled by a conventional photograph timer 151. After the paper has been exposed, it is carried through the developer trough 67, dried in dryer 69 and discharged through opening 42 as a plate ready for use. Simultaneously, the motor 131 is cycled so that sprocket 134 turns a sufficient number of pins to move the film one frame, the location of the film being controlled by pawl 144 and cam 143. The operation is then ready for repetition.

ELECTRICAL OPERATION

Figure 8:
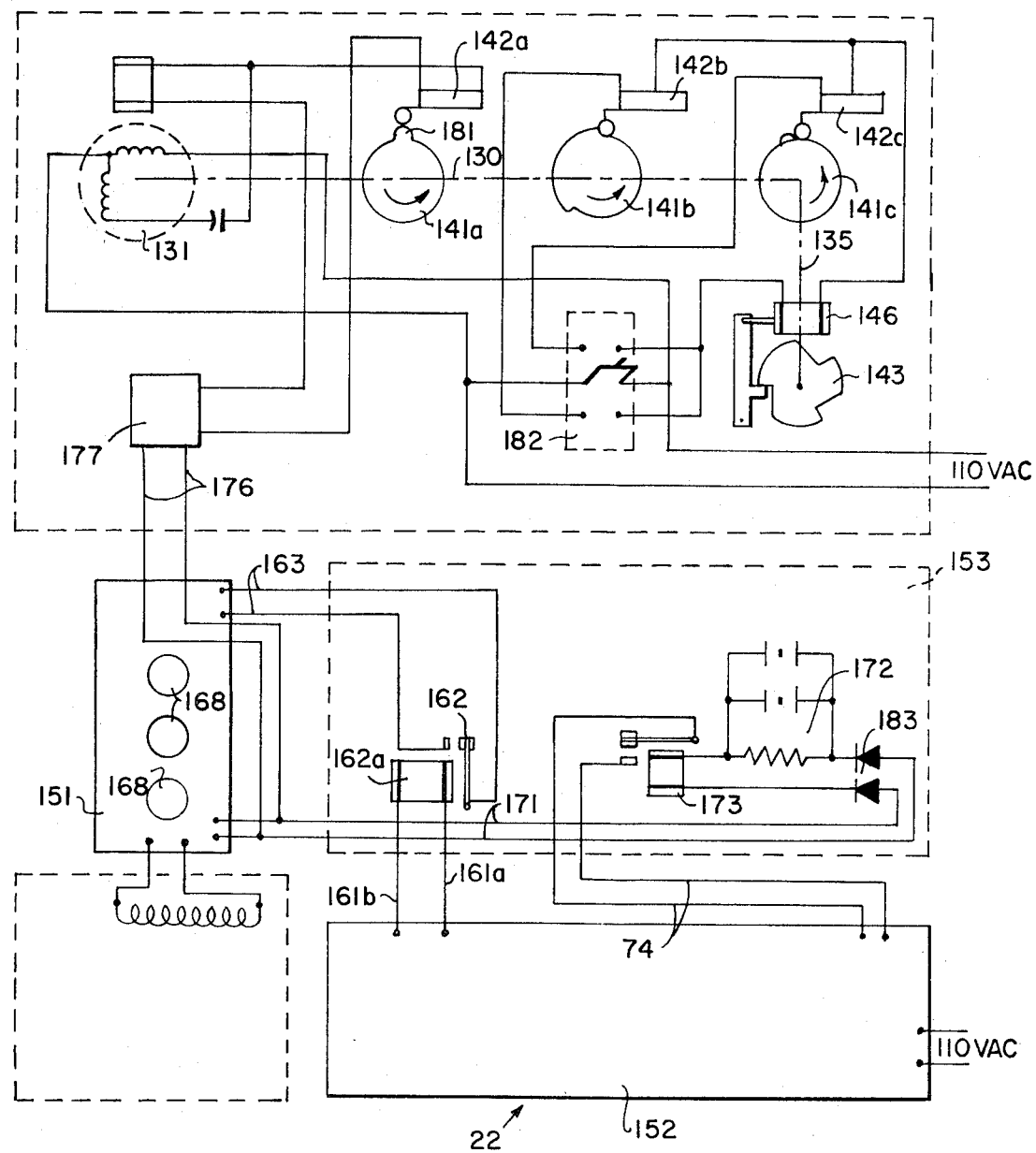
FIG. 8 is a schematic wiring diagram of some of the electrical and mechanical components of the machine.

With certain modifications herein explained, the present system (see FIG. 8) uses the electrical systems 151, 152 of commercially available timer for the enlarger and copier 22. Timer 151 is Lektra Laboratories, Inc., Model TM-8 or equivalent.

At one point in the cycle of copier 22 the cut plate reaches exposure position. An impulse (which would in normal operation of the copier energize the scanner function) through wires 161 a, b energizes coil 162a in relay box 153. Closing of contacts 162 energizes the "remote start" function 163 of timer 151. Timer 151 energizes the coil 167 of shutter 87 for a time interval selected for proper exposure and set by dials 168, whereupon coil 167 is deenergized. Timer 151 has a "safe-lite" function which is activated when the shutter timer is deactivated. One set of wires 171 from the safe-lite function is fed into a rectifier 183 and a momentary delay 172 on relay 173. The delay allows the shutter 87 to close before the paper begins moving through the machine to be processed. Relay 173 closes and acts as a switch through wire 174 to recycle the electrical circuit 152 of copier 22 to print the exposed plate and feed the next plate into exposure position. When the latter occurs, contacts 162 are again closed. The safelite function of timer 151 has a second function. Through wires 176 and time delay 177 it is connected to energize solenoid clutch 132 of motor 131. Relay 177 is on for approximately 1 second. In such time interval, the high dwell 181 of cam 141a is out of contact with the switch arm of switch 142a and thereafter until the completion of the cycle cam 143 is energizing solenoid 132.

Switch 182 is a double pole switch connected to an AC source and may be used to energize either of switches 142b, 142c connected with cam 141b or cam 141c depending upon whether there are six perforations or four perforations per frame of film 105. Assuming that cam 141c is six perforations, switch 142c closes energizing solenoid 146 to retract pawl 144 and then to bring the pawl into stop position so that pawl 144 is held against a shoulder of cam 143. Cam 141a continues operating for about 20° and then shuts off.

When cam 141a reaches its high dwell, clutch solenoid 132 is turned off, film and paper now being in position for exposure.

What is claimed is:

1. A machine comprising an electrostatic copier having a casing with an open top, storage means for paper, said paper of the type coated with a material which holds an electrostatic charge which is discharged by exposure to light, corona means for applying a static charge to said paper, support means for supporting charged paper below said open top, a toner trough for subjecting said paper to a toner chemical comprising carbon ions in a dispersant, transport means for advancing said paper from said storage means through said corona means to said support means, holding said paper at said support means, and then advancing said paper through said toner trough to the exterior of said casing, and an electrical drive for said transport means; an enlarger having a lens mounted to project light through said open top, focusing means to focus said light on paper on said support means, a source of light, light timing means for optically connecting said source and said lens for a limited time period; an electrical timer controlling opening and closing of said light timing means; a film advance having a frame interposed between said light timer means and said lens, a microfilm input reel mount at one end and a microfilm takeup reel mount at the opposite end of said frame, guide means on said frame for centering film fed from said input reel laterally of said frame relative to the optical axis of said lens, film engaging means engaging said film to pull said film longitudinally of said frame, and longitudinal film moving means for centering frames of film longitudinally relative to said optical axis, said last-named means comprising a motor arranged to drive said film engaging means, motor disengaging means driven by said film engaging means to discontinue drive of said film after said film has advanced a predetermined distance, and stop means accurately limiting forward movement of said film; and an electrical circuit means to first advance paper from said storage means to said support means, then to energize said electrical timer to open said light timing means for a preselected interval, and then simultaneously to advance said film one frame length while advancing one sheet from said support means out of said casing while advancing the next sheet from said support means out of said casing.

2. A machine according to claim 1, which further comprises a table on which said copier is mounted, said table movable in two directions transverse to each other and each transverse to said optical axis to adjust the position of said support means relative to said optical axis, and latch means to restrain said table against movement.

3. A machine according to claim 1, in which said copier further comprises means for supporting a roll of paper at said storage means and cutting means to sever a sheet of predetermined length from said roll as said transport means moves said paper toward said support means.

4. A machine according to claim 1, which further comprises positive carbon ions dispersed in liquid in said toner trough.

5. A machine according to claim 1, in which said enlarger has a head containing said lens, focusing means and source of light and which further comprises an adjustable support for said head to move said head toward and away from said support means along said optical axis.

6. A machine according to claim 5, in which said head is formed with an aperture to receive said film advance and film advance latch means for securing said film advance in said head in a predetermined, accurate position.

7. A machine according to claim 1, in which said electrical circuit includes an electrical impulse generator in said copier activated when said paper has advanced to said support means, a first relay activated by said impulse generator and a time delay second relay, said electrical timer activated by said relay and having electrical means to open said light timer means for a predetermined period and then close said light timer means and open a safelite function, said safelite function arranged to activate said second relay after a time delay to energize said electrical drive for said transport to recycle said transport means for another cycle of movement of said paper and said safelite function also energizing said motor to drive said film the distance of the length of one frame.

* * * * *